Figure 1:
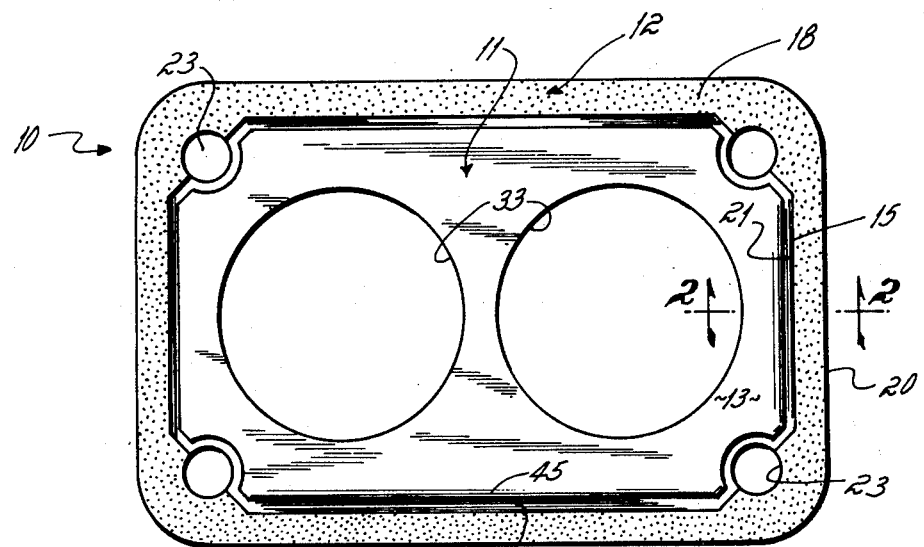

United States Patent [19]
Decker

[11] 3,986,721
[45] Oct. 19, 1976

[54] TWO COMPONENT GASKET AND METHOD OF MAKING IT

[75] Inventor: John W. Decker, Stockbridge, Mich.

[73] Assignee: Eagle-Picher Industries, Inc., Cincinnati, Ohio

[22] Filed: Aug. 8, 1975

[21] Appl. No.: 603,021

[52] U.S. Cl.............................. 277/166; 277/180; 277/227
[51] Int. Cl.² .......................................... F16J 9/06
[58] Field of Search ........... 277/180, 227, 188, 166, 277/235 B

[56] References Cited
UNITED STATES PATENTS

| | | | |
|---|---|---|---|
| 3,462,161 | 8/1969 | Daubenberger et al. | 277/180 X |
| 3,655,210 | 4/1972 | Farnam et al. | 277/227 |
| 3,726,178 | 4/1973 | Dimitry | 277/180 |

FOREIGN PATENTS OR APPLICATIONS

| | | | |
|---|---|---|---|
| 836,197 | 6/1960 | United Kingdom | 277/180 |

Primary Examiner—Samuel B. Rothberg
Attorney, Agent, or Firm—Wood, Herron & Evans

[57] ABSTRACT

In the manufacture of a gasket wherein a rigid, compression-limiting component is formed by molding in situ against the side of a preformed compressible gasket component to bond therewith, a narrow channel is pressed into the face of the gasket component during the molding operation. The gasket material is permanently deformed in this channel, which runs on the gasket face adjacent the edge of the side to which the rigid component is molded. The channel provides a durable, reproducible demarcation between the compressible and rigid components. Formation of this channel in molding has been found to prevent flashing of the material being molded, over the gasket face.

9 Claims, 6 Drawing Figures

U.S. Patent  Oct. 19, 1976  3,986,721

TWO COMPONENT GASKET AND METHOD OF MAKING IT

The invention relates to the manufacture of two-piece composite gaskets, wherein a rigid or compression-limiting component is molded in place against, and bonded to, the side of a precut compressible component. More particularly, the invention relates to a method and structure for defining a durable, reproducible join line between the two components.

BACKGROUND OF THE INVENTION

In the manufacture of gaskets, for example automobile carburetor gaskets, it is known to associate the compressible gasketing material with a rigid non-compressible component which provides a stop or positive limit to the compression of the gasketing component. The gasketing component is usually a relatively thick flat sheet, ported for the flow of liquids and/or gases. The rigid compression limiting stop may be in the form of a ferrule, bushing, or grommet, secured in an opening in the gasketing material. The rigid stop may also provide the bolt hole. As the bolts are tightened in mounting the gasket (for example, to form a seal between an engine intake manifold and the carburetor throttle body) the gasket component is compressed to form the seal, but the compression is limited by the point at which the opposed engine components bottom out on opposite faces of the rapid stop. Such gaskets are shown in Farnham U.S. Pat. No. 3,655,210.

In a reverse arrangement, the rigid compression limiting component may form an outer boundary or rim around the periphery of the gasket component, the latter being seated in the former, as shown in Olson U.S. Pat. No. 3,355,181; Moyers U.S. Pat. No. 3,195,906; and Papenguth U.S. Pat. No. 3,215,442.

In the manufacture of both such types of two-component gaskets, it is desirable to mold the rigid component in situ against the preformed compressible gasketing component. The rigid component may be molded from a flowable resin which may be a thermosettable plastic. It is desirably injection molded in, or around, the compressible component. The compressible component must of course be thicker than the rapid, compression-limiting component, so as to be compressed in use and thereby from a seal.

In the manufacture of such gaskets, the compressible material is conveniently preformed, for example by die-cutting it to size. The preformed part is then seated within the cavity of an injection mold, and the molding material is injected into a cavity one edge which is formed by the side of the compressible material. As the molding material cures or sets up, it also bonds integrally to the side of the compressible component. This seals the side of the gasket to inhibit wickage and fluid transfer laterally.

In making gaskets by the process described, it is difficult to get a reproducible, durable line of demarcation between the two components, that is, where the rigid component meets the compressible component. In particular, the molding material under the pressure of injection, tends to form an irregular flashing which projects onto the gasketing face of the adjacent compressible material. The flashing appears even though the compressible material is thicker than the rigid component. This flashing, since it is not elastic or compressible, can impair the seal, and in any event is undesirable from an appearance standpoint.

I have found that this flashing occurs as the result of either or both of two factors: permanent edge deformation of the compressible component when it is precut, and secondly, elastic compression of that component between the mold halves as the second component is injection molded to it. As a result of the die-cutting step, the edge of the compressible material, where the gasketing face meets the side which is to be bonded to the plastic molding, may become somewhat deformed and rounded as a sloping shoulder surface. The side of the compressible material does not meet the face at a precise angle. This rounded edge is presented to the flowable resin, in the molding, which flows onto the sloping shoulder as an irregular and unsightly flashing. But whether or not a rounded shoulder is present, the molding pressure will escape from the cavity under the high pressure of molding, and will flow over the face of the gasket as a flashing.

It has been the objective of this invention to provide a method and structure whereby this flashing can be prevented from forming a molding, with the resultant production of a crisp, sharp join line between the bonded-together rigid and compressible components, even though the latter presents a rounded corner in standing proud of the former.

More particularly, it has been found that this flashing can be altogether prevented by providing an elongated, narrow compression rib on at least one of the injection mold halves, the rib being positioned adjacent and generally parallel to the edge of the compressible component so that it encircles the latter. In molding, the resin flow up to and against this rib, which forms an edge of the cavity in which the molding material is injected. The ridge has sufficient depth, relative to the surface of the mold, that it bears upon the compressible component and, like a dam, prevents the flow of molding material past it. The rib may overlie or straddle the edge of the face of the compressible material, but in any event its cross section must at least partially overlie the compressible component. In the resultant product, the impression of this rib is manifested as a permanently deformed channel, on one side of which forms the edge of the rigid component. The edge is sharp and reproducible, and the formation of flashing is obviated.

Figure 3:
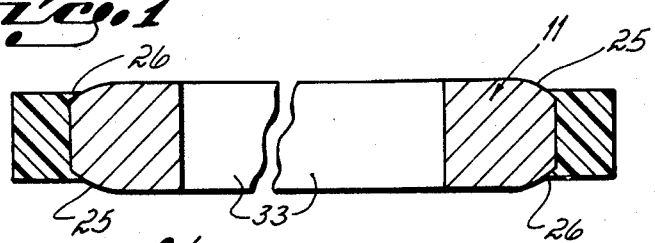
Figure 2:
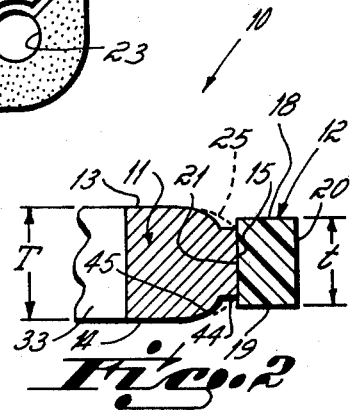
Figure 4:
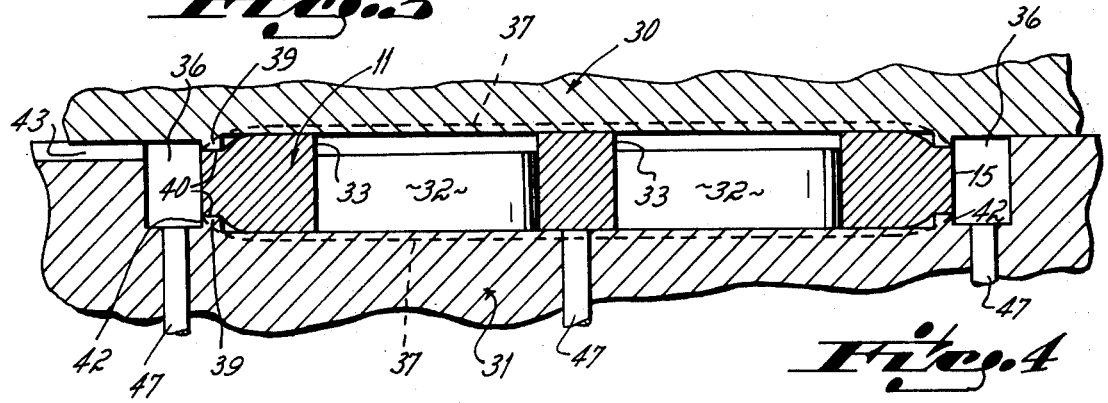
Figure 5:
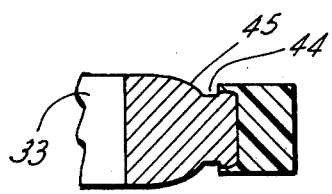
Figure 6:
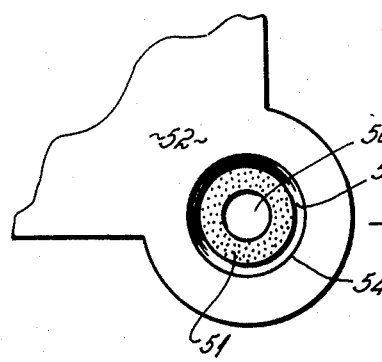

This invention can best be further described and its advantages understood by reference to the accompanying drawings in which, FIG. 1 is a top plan view of an automobile manifold-to-carburetor gasket incorporating a preferred embodiment of the invention, FIG. 2 is an enlarged fragmentary vertical section taken on line 2—2 of FIG. 1, FIG. 3 is a sectional view of a two-component gasket molded without use of the invention, and particularly shows the flashing formed at the join line between the rigid and the compressible components, FIG. 4 is a fragmentary vertical cross section of a preferred form of injection molding die, for carrying out the method of the invention, FIG. 5 is a sectional view similar to FIG. 2 but shows a modified embodiment of the invention wherein the pressed-in channel is offset inwardly from the side of the compressible component, and FIG. 6 is a fragmentary top plan of a gasket wherein the rigid component is surrounded by the compressible component, and incorporates the invention.

In FIG. 1, practice of the invention is illustrated by way of explanation in connection with a carburetor gasket and heat insulator indicated generally at 10. The article 10 comprises two components which are integrally bonded together, a relatively thicker central, compressible component 11 and a relatively thinner surrounding or peripheral incompressible component 12. In this embodiment the compressible component 11 is generally flat and has opposed gasketing or sealing faces 13 and 14, and a peripheral or side surface 15 which is generally perpendicular to the planes of faces 13 and 14. The side 15 is bonded to the second component 12.

The compressible component 11 may be cut from conventional gasketing material. A wide variety of suitable gasketing materials are commercially available, including rubber and rubberlike materials, compressible asbestosboard, or fiberboard materials, cork, composites and the like. The preferred material is asbestosboard, for example such as sold by Colonial Fiber Corp., Manchester, Conn. under the designation S-601 High Temp. Also especially suitable is hard cellulose fiberboard to the faces of which is laminated a compressible gasket skin or liner, about .002 to .005 inch thick. Exemplary of this material is that sold by Colonial Fiber Corp. under the designation S-560.

The component 12 around component 11 has parallel upper and lower faces 18 and 19, an outside surface 20, and an inside surface 21 which meets and is integrally bonded to side surface 15 of the compressible element 11. This component is rigid, i.e., substantially less compressible than 11, so as to limit compression of the latter in service.

Again, the nature of the molding material of which the rigid component 12 is formed is not critical and does not form the invention. The material should, however, be one which can be injection molded in situ around the compressible material 11, and which will bond to it in the process. A suitable material, without limitation, for the rigid component 12 is a moldable phenolic resin. The material may be asbestos or fiberglass filled. Other examples of suitable materials include nylon, ABS, acrylic, and urea-formaldehyde resins.

Whatever the particular nature of the material from which the component 12 is molded, the material should be one which can be introduced into a die to fill a cavity defined in part by the side 15 of the compressible component 11, and which can be rigidified or thermoset in the mold, and which will bond to the particular material of gasket 11 in the process. As one example, a phenolic resin will thermoset and simultaneously bond to a ¼ inch fiberboard core at a temperature of approximately 375°–450° F for approximately .1 to 1 minute.

From FIG. 2, it can be seen that the compressible component 11 has a thickness T which exceeds the thickness t of the rigid element 12. While the actual thicknesses are not critical, t may vary from about .10 to .50 inch. The difference in thicknesses, T − t, is typically in the range of a few thousandths of an inch, e.g., 0.002 to 0.030 inches. The difference in thickness permits the gasket component 11 to be compressed in use, down to the thickness t of rigid element 12, thereby to effect a seal between the engine components between which article 10 is mounted. The rigid component 12 does not compress substantially. This limits the compression of gasket component 11, while providing the required bolt torque retention. The actual difference in thickness for any given gasket will of course depend on the comparative hardness of the actual compressible material used.

The article 10 is provided with a plurality of bolt holes, as designated at 23, which may be at its four corners. In the embodiment shown these bolt holes 23 lie on the join line 15, 21 between the compressible component 11 and the rigid component 12, however this is not critical and the bolt holes 23 may reside entirely within the rigid component.

In the manufacture of the article 10, the compressible component 11 is performed, as by die-cutting, stamping or the like. In the forming of this material, especially by die cutting, the pressure of the cutting edge may tend to permanently deform the faces 13 and 14 adjacent the sides 15, forming a round or tapered shoulder along the side, as illustrated by the dotted lines at 25 in FIG. 2.

In the absence of invention, this rounded shoulder 25 would permit the formation of a flashing, as shown at 26 in FIG. 3, during the molding step. The rounded shoulder would permit the fluid molding material to creep from the cavity onto the faces 13 and 14; and there would be no durable reproducibly defined edge to the side 21 of the molded rigid component. A thin, brittle irregular line of flashing as designated at 26 in FIG. 3 would result. Moreover, apart from any shoulder roundness, the high injection pressure on the resion (typically about 3200–4000 psi) can result in resin flow between the faces of component 11 and the adjacent die face. The resulting flashing can extend completely across the gasketing face and can seriously affect the performance of the part 10 for its intended function, as well as detract from appearance.

In molding the rigid component around (or into) the compressible component in accordance with the invention, the preformed component 11 is placed and gripped between two opposing halves of an injection molding die, the mold halves being designated at 30 and 31 respectively in FIG. 4. The uncompressed thickness of component 11 is indicated by the dotted lines at 37 in FIG. 4. The component is positioned or aligned within the mold halves, for example on bosses 32, 32 which extend into the fluid ports 33, 33 that have been cut into the component 11. A cavity 36 remains around component 11, in which component 12 is to be formed. The faces of the mold halves may be essentially planar, with an exception to be described. Component 11 is usually squeezed between the faces, for example at a clamping pressure of about 800 psi. As a result of this squeezing of component 11 in the mold, the edge of the respective face 13 or 14 is brought inwardly of the intended edge, in cavity 36, for the component 12.

A convex, compressing rib 39 is formed on the respective mold halves 30 and 31, at a position such that it will bear on and further compress the component 11, adjacent to shoulder 25 along face 15 thereof. This rib 39, as can be seen in FIG. 4, is sectioned to present a crisp, preferably squared, edge around the mold cavity 36. In molding, its inner face 40 extends below the level of rounded shoulder 25. Compression rib 39 must be positioned in the mold cavity so that in section, it will at least partially overlie and bear upon the compressible material 11. As shown in FIG. 4, rib 39 maay be positioned so that its outside wall 42 lies substantially in the same plane as the face 15 against which the component 12 is to be molded; or, as shown in the alternative embodiment of FIG. 5, the rib may be positioned to lie entirely within the surface of component 11. The rib alternatively may straddle the join line 15, 21, overlying both components 11 and 12. The height of the rib above the mold surface should exceed ½ (T − t), to achieve the desired compression in molding.

In the molding operation, as the mold halves 30 and 31 are brought together, the ribs 39 engage the component 11 on the opposite faces 13 and 14 thereof, and compress it, preferably beyond its elastic limits, so as permanently to deform the component. Rib 39 provides a sharply defined wall 42 transverse to faces 13 and 14, and by the compress, this wall positively confines the material to be molded in cavity 36, until it is rigidified. The compression desirably leaves a permanent channel or groove 44 that extends along the join 15–21 between the components 11 and 12, where flashing would otherwise occur. The molding fluid is injected in the conventional manner, as through injection port 43. The cavity 36 is thus closed on the edge face adjacent to component 11, by the face 15 of the latter and by the ribs 39 adjacent to faces 13 and 14. When rigidified, the composite part is ejected, as by ejection pins 47. While a rounded shoulder 45 may yet remain along channel 44 on the opposite side thereof from that adjacent to component 12, no flashing will be present. The edge of the channel marks the edge of the rigid component.

The rib 39 may be about .030 inch high × .030 inch wide, although this is not critical. The component will rebound from compression under the rib to some extent, but some permanent deformation is preferred.

From the foregoing it can be seen that the invention is useful in connection with the molding of a rigid plastic rim around a compressible gasket core. It should also be understood that the invention is also useful in the reverse circumstance, that is, where the rigid component is molded within an opening defined by a surrounding compressible component, as shown in FIG. 6, where a bolt hole 50 is present in a rigid ferrule 51 that is molded in a corner opening 54 in the compressible material 52, with a channel 53 around the ferrule.

What is claimed is:

1. An article of manufacture comprising a thinner, rigid component which is bonded along an edge thereof to a thicker compressible component, the compressible component having two flat opposite major faces which are generally parallel to one another and a side surface between said major faces, said rigid component having two faces which are generally parallel to one another and the said major faces of the compressible component, said rigid component having a side edge which is molded integrally onto the said side surface of the compressible component, said article being characterized in the provision of a channel on at least one major face thereof, each such channel lying adjacent to the respective side surface of the compressible component, each said channel being a surface deformation of said compressible material in the major face thereof, beyond its elastic limit, one side of each channel defining an edge of said rigid component.

2. The article of claim 1 wherein said article is a gasket, and said compressible component is made of a gasketing material, and said rigid component in use limits the compression of the compressible component.

3. The article of claim 1 wherein said channel joins the respective face of said compressible component by a rounded shoulder.

4. The article of claim 1 wherein said rigid component surrounds said compressible component, as a boundary for the latter.

5. The article of claim 1 wherein said rigid component is seated entirely within an opening in said compressible component, the compressible component surrounding the rigid component.

6. The article of claim 1 wherein bolt holes are formed through the article perpendicular to the face thereof, said bolt holes lying at least partially within said rigid component.

7. The article of claim 1 wherein the depth of said channel is more than ½ of the amount by which the thickness of the compressible component exceeds the thickness of the rigid component.

8. The article of claim 1 wherein said rigid component is a thermoset resin.

9. The article of claim 1 wherein said rigid component is a thermoplastic resin.

* * * * *